US010308362B2

(12) United States Patent
Trimble

(10) Patent No.: US 10,308,362 B2
(45) Date of Patent: Jun. 4, 2019

(54) TRAY TABLE ASSEMBLY

(71) Applicant: Safran Seats USA LLC, Gainesville, TX (US)

(72) Inventor: Robert W. Trimble, Gainesville, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/522,408

(22) PCT Filed: Nov. 30, 2015

(86) PCT No.: PCT/US2015/062973
§ 371 (c)(1),
(2) Date: Apr. 27, 2017

(87) PCT Pub. No.: WO2016/089759
PCT Pub. Date: Jun. 9, 2016

(65) Prior Publication Data
US 2017/0355465 A1 Dec. 14, 2017

Related U.S. Application Data

(60) Provisional application No. 62/085,840, filed on Dec. 1, 2014.

(51) Int. Cl.
*B64D 11/06* (2006.01)
*B60N 3/00* (2006.01)

(52) U.S. Cl.
CPC ......... *B64D 11/0638* (2014.12); *B60N 3/004* (2013.01); *Y02T 50/46* (2013.01)

(58) Field of Classification Search
CPC ............ B64D 11/0638; B64D 11/0605; B60N 2/206; B60N 3/001; B60N 3/002;
(Continued)

(56) References Cited

U.S. PATENT DOCUMENTS

| 508,938 | A | * | 11/1893 | Hamilton | ................. | A47B 5/06 |
| | | | | | | 108/33 |
| 963,502 | A | * | 7/1910 | Bond | ....................... | A47B 1/06 |
| | | | | | | 108/68 |

(Continued)

FOREIGN PATENT DOCUMENTS

| DE | 102011011657 | 8/2012 |
| WO | 2003064207 | 8/2003 |
| WO | 2005016752 | 2/2005 |

OTHER PUBLICATIONS

International Patent Application No. PCT/US2015/062973, Search Report and Written Opinion, dated Feb. 2, 2016.

(Continued)

*Primary Examiner* — Timothy J Brindley
(74) *Attorney, Agent, or Firm* — Kilpatrick Townsend & Stockton LLP; Dean W. Russell; Aben D. Allen

(57) ABSTRACT

Described are tray table assemblies having a table body (114) and a biasing mechanism (144). The table body can be movable between a stowed configuration and a deployed configuration. The table body in the stowed configuration can be positioned so that at least a portion of the table body can be situated within a cavity (142) defined along a downwardly projecting lip (140). The table body in the deployed configuration can extend transverse to the orientation of the table in the stowed configuration. The biasing mechanism can bias the table body into the cavity in the stowed configuration.

20 Claims, 5 Drawing Sheets

(58) Field of Classification Search
CPC .......... B60N 3/004; A47B 5/006; A47B 5/00; A47B 5/04; A47B 5/06; A47B 1/10; B65D 43/20
USPC ..... 312/138.1; 220/244, 246, 813, 811, 812; 108/40, 42, 46
See application file for complete search history.

(56) References Cited

U.S. PATENT DOCUMENTS

| | | | | |
|---|---|---|---|---|
| 2,223,958 | A * | 12/1940 | Laursen | A47C 9/06 108/40 |
| 2,963,078 | A * | 12/1960 | Ferrelle | B60N 3/004 108/38 |
| 3,795,422 | A * | 3/1974 | Robinson | A47C 7/70 244/122 R |
| 4,159,071 | A * | 6/1979 | Roca | A47C 7/70 108/42 |
| 4,263,854 | A * | 4/1981 | Moore | A47B 83/045 108/37 |
| 4,511,178 | A * | 4/1985 | Brennan | B64D 11/0638 297/146 |
| 4,726,621 | A * | 2/1988 | Muller | B60N 3/004 297/146 |
| 5,487,342 | A * | 1/1996 | Mack | A47B 5/04 108/40 |
| 5,492,257 | A * | 2/1996 | Demick | B60R 7/02 224/275 |
| 5,513,574 | A * | 5/1996 | Collins | A47B 5/06 108/33 |
| 5,931,527 | A * | 8/1999 | D'Onofrio | B60R 5/045 297/146 |
| 6,308,641 | B1 * | 10/2001 | Kingbury | A47B 5/04 108/42 |
| D487,856 | S * | 3/2004 | Kalinowski | D6/356 |
| 6,761,398 | B2 * | 7/2004 | Bentley | B60N 2/22 297/146 |
| 6,814,404 | B2 * | 11/2004 | Jensen | A47C 7/38 108/13 |
| 7,004,430 | B2 * | 2/2006 | Weekly | B60N 3/004 16/248 |
| 7,073,449 | B2 * | 7/2006 | Pipkin | A47B 23/00 108/25 |
| D605,863 | S * | 12/2009 | Aruga | D6/356 |
| 7,658,153 | B1 * | 2/2010 | Patoka | B60R 11/00 108/152 |
| 7,836,832 | B2 * | 11/2010 | Boyd | A47B 5/00 108/143 |
| 8,444,005 | B2 * | 5/2013 | Kawai | G03B 17/02 220/323 |
| 8,540,309 | B2 * | 9/2013 | Berger | B64D 11/0015 108/134 |
| 8,763,976 | B1 * | 7/2014 | Jachim | B41J 29/04 108/43 |
| 8,851,565 | B2 * | 10/2014 | Hontz | B60N 3/004 297/188.04 |
| 9,138,055 | B2 * | 9/2015 | Curtis | A47B 83/02 |
| 9,610,879 | B2 * | 4/2017 | Zheng | B60N 3/004 |
| 9,781,997 | B2 * | 10/2017 | Maertens | A47B 47/042 |
| 9,919,802 | B2 * | 3/2018 | Stephens | B64D 11/0638 |
| 2004/0112258 | A1 * | 6/2004 | Fichman | A47B 5/04 108/38 |
| 2007/0205208 | A1 * | 9/2007 | Ueda | G03B 17/02 220/813 |
| 2009/0174234 | A1 * | 7/2009 | Vignal | B60N 3/002 297/163 |
| 2012/0139303 | A1 * | 6/2012 | Westerink | B64D 11/0015 297/163 |
| 2013/0098276 | A1 * | 4/2013 | Trinko | A61G 13/009 108/33 |
| 2014/0183910 | A1 * | 7/2014 | Ulbrich-Gasparevic | B60N 3/004 297/135 |
| 2014/0318422 | A1 * | 10/2014 | Neuhaus | B60N 2/242 108/44 |
| 2015/0061327 | A1 * | 3/2015 | Millan | B60N 3/004 297/163 |
| 2015/0068435 | A1 * | 3/2015 | Maslakow | B64D 11/0638 108/42 |
| 2017/0283067 | A1 * | 10/2017 | Darbyshire | B64D 11/0638 |
| 2017/0355465 | A1 * | 12/2017 | Trimble | B64D 11/0638 |

OTHER PUBLICATIONS

European Patent Application No. 15807775.0, Examination Report (Communication Pursuant to Article 94(3) EPC) dated Mar. 4, 2019, 4 pages.

* cited by examiner

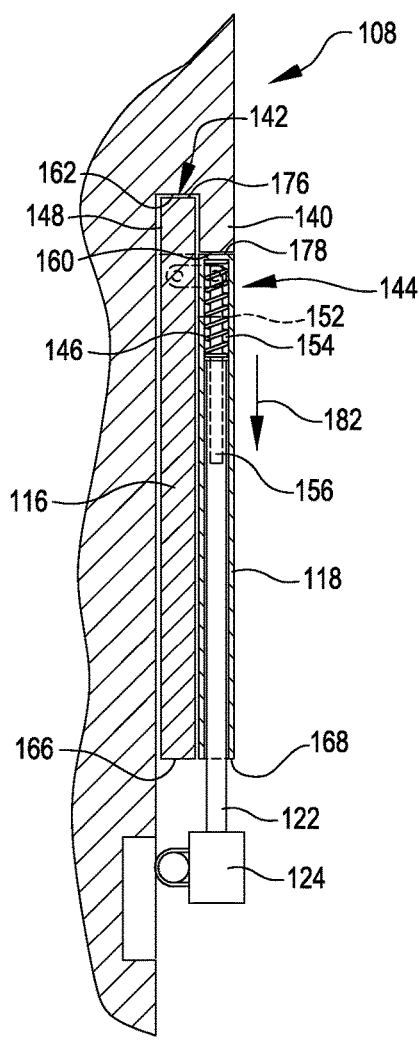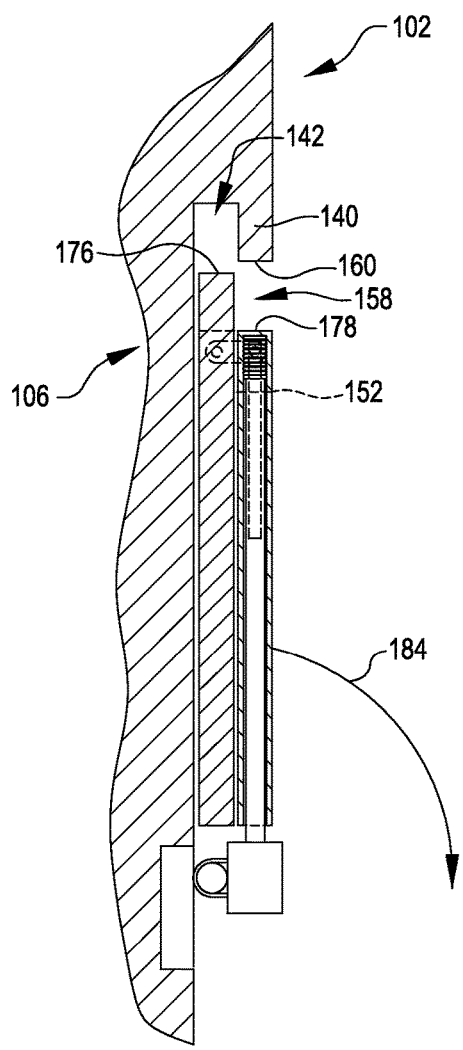

TRAY TABLE ASSEMBLY

CROSS REFERENCE TO RELATED APPLICATIONS

This patent application is the U.S. national stage of PCT/US2015/062973, filed on Nov. 30, 2015, which application is related to and claims priority benefits from U.S. Provisional Application Ser. No. 62/085,840, filed on Dec. 1, 2014, entitled LATCHLESS FOOD TABLE, the entire contents of each of which are hereby incorporated in their entireties by this reference.

FIELD OF THE INVENTION

The field of the invention relates to tray table assemblies for passenger vehicles such as aircrafts.

BACKGROUND

Tray tables are widely used in most aircraft seat assemblies. The tray table sub-assembly is typically pivoted on a pair of arms which allows the tray table to swivel between deployed and stowed positions, for example, relative to the back of the aircraft seat. This can provide a convenient table for a person sitting in a position facing the rear of the seat, such as a passenger situated aft of a forward-facing seat. When deployed, tray tables may be used as a surface for supporting food, drink, or other items, such as for work or entertainment during travel. The pivoting nature of the tray table may be useful in allowing the tray table to be readily deployed when desired by a seated passenger or readily stowed, such as to facilitate egress or ingress relative to the seat.

Different latch assemblies exist for retaining tray table assemblies in an upright stowed position when not in use. Various latch assemblies include either a lever (e.g., which may be rotated around an axis) or a slider (e.g., which may move linearly) that may be moved over a portion of a tray table assembly in the upright stowed position. In such a configuration, the lever or the slider can obstruct the pivoting motion of the tray table assembly. In many cases, the lever or slider can stop the tray table assembly from further movement after the tray table assembly has been pivoted to an upright stowed position against the rear of the seat.

Various issues, however, may arise with such latch assemblies. A lever or slider, for example, may protrude a sufficient amount as to be easily bumped by passengers during ingress or egress from the seat. This incidental contact may trigger inadvertent release and sudden movement of the tray assembly table, which may result in injury to passengers or damage to passengers' belongings or other items. Inadvertent release and corresponding harm may similarly occur due to forces or contact encountered during a crash scenario. Additionally, a lever or slider may be a projecting feature that poses an increased risk of injury for a passenger in a crash scenario. Furthermore, a lever or slider may also add additional weight to an aircraft, which is desirably avoided.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, tray table assemblies can include a table body and a biasing mechanism. The table body can be movable between a stowed configuration and a deployed configuration. The table body in the stowed configuration can be positioned so that at least a portion of the table body can be situated within a cavity defined along a downwardly projecting lip. The biasing mechanism can be configured to bias the table body into the cavity when the table body is in or approaching the stowed configuration.

In some embodiments, the biasing mechanism may include a spring. The table body in the deployed configuration may extend transverse to the orientation of the table in the stowed configuration. The table body may include a first leaf hinged with a second leaf. The table body may include a single panel.

According to certain embodiments of the present disclosure, a passenger seat can include a seat back, a lip, a cavity, a table body, and a biasing mechanism. The seat back can have a front and a rear. The lip can project downwardly along the rear of the seat back. The cavity can be defined at least partially by the lip, for example, between the lip and the front of the seat back. The table body can be movable between a stowed configuration and a deployed configuration. The table body in the stowed configuration can be positioned so that at least a portion of the table body is situated within the cavity. The biasing mechanism can bias the table body into the cavity when the table body is in the stowed configuration.

In some embodiments, the table body of the passenger seat includes a first leaf and a second leaf. The first leaf may include a tab and the second leaf may include a notch. The notch can be sized to receive the tab in the deployed configuration. The notch can be sized to receive one or more fingers of a person in the stowed position so as to facilitate pulling the table body from the stowed configuration.

In some embodiments, the table body of the passenger seat includes a single leaf. The single leaf may include a groove in a side of the single leaf facing away from the front of the seat back. The groove can be sized to receive one or more fingers of a person in the stowed position so as to facilitate pulling the table body from the stowed position.

In some embodiments, the biasing mechanism of the passenger seat includes a spring. The biasing mechanism may be located at least partially within the table body.

In some embodiments, the table body of the passenger seat may be pivotally coupled with the seat back so as to at least partially rotate in moving between the deployed and stowed configurations. The table body in the deployed configuration may extend transverse to the seat back.

In some embodiments, the passenger seat also includes a shroud coupled with the seat back. The shroud may include the lip.

According to certain embodiments of the present disclosure, a method is provided. The method can include receiving, along a seat back, a table body rotated into an aligned position beneath a cavity defined by a downwardly projecting lip. The method can also include biasing by a biasing mechanism, from the aligned position beneath the cavity, at least a portion of the table body upward into the cavity.

In some embodiments, the biasing mechanism referenced in the method includes a spring.

In some embodiments, the method can include receiving, along the seat back, the table body translated from at least partially within the cavity into a disengaged position beneath the cavity in response to a downward force exerted on the table body with sufficient magnitude to overcome a biasing force provided by the biasing mechanism. The method may also include providing, in a position transverse to the seat back, the table body rotated from the disengaged position.

In some embodiments, the method can include providing a flat surface of the table body by a first leaf of the table body rotating about hinges coupling the first leaf of the table body with a second leaf of the table body.

In some embodiments, the method can include receiving the table body translated toward the seat back into a ready configuration in response to a pushing force exerted on the table body with sufficient magnitude to overcome a biasing force provided by the biasing mechanism. Receiving the table body rotated into the aligned position may include receiving the table body rotated from the ready configuration.

In some embodiments, the table body referenced in the method includes a first leaf and a second leaf. In some embodiments, the table body referenced in the method includes a single leaf.

BRIEF DESCRIPTION OF THE DRAWINGS

FIG. 3 is a side cross-sectional view of the tray table assembly of the seat of FIGS. 1-2, showing the tray table in the stowed configuration.

FIG. 4 is a side cross-sectional view of the tray table assembly of the seat of FIGS. 1-3, showing the tray table disengaged from the stowed configuration.

DETAILED DESCRIPTION

The subject matter of embodiments of the present disclosure is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying requirement of any particular order or arrangement among or between various steps or elements except when the order of individual steps or arrangement of elements is explicitly described.

This disclosure provides table assemblies for passenger seats. While the table assemblies are discussed for use with aircraft seats, they are by no means so limited. Rather, embodiments of the table assemblies may be used in passenger seats or other seats of any type or otherwise as desired. For example, embodiments may be used on trains, buses, movie theaters, student seating, or any other instance when a tray table on a forward structure may be useful.

In various embodiments, the table assemblies may include elements which allow passengers to move the table assemblies between deployed configurations and stowed configurations without also manipulating a distinct latching mechanism. For example, in various embodiments, a passenger or other user may deploy a table by merely pulling the table downward and outward from a seat back. This may vertically remove the table from a secured position behind a downward lip of the seat back and allow the table to rotate away from the seat back toward the deployed configuration. Similarly, in various embodiments, a passenger may stow the table by merely pushing the table toward supporting arms of the table, rotating the table upward toward the seat back, and releasing the table upon alignment with the seat back. This may allow the table to be pushed by springs or other biasing mechanisms upward behind the downward lip into a secured position. Thus, in various embodiments, additional sliding or rotating of a latching mechanism that is distinct from the table may be avoided when deploying and/or stowing the table. This may render such latch mechanisms redundant, and allow such latch mechanisms to be omitted. In many cases, omitting such latch mechanisms may provide safety improvements, weight reduction, and/or cost savings.

Figure 1:
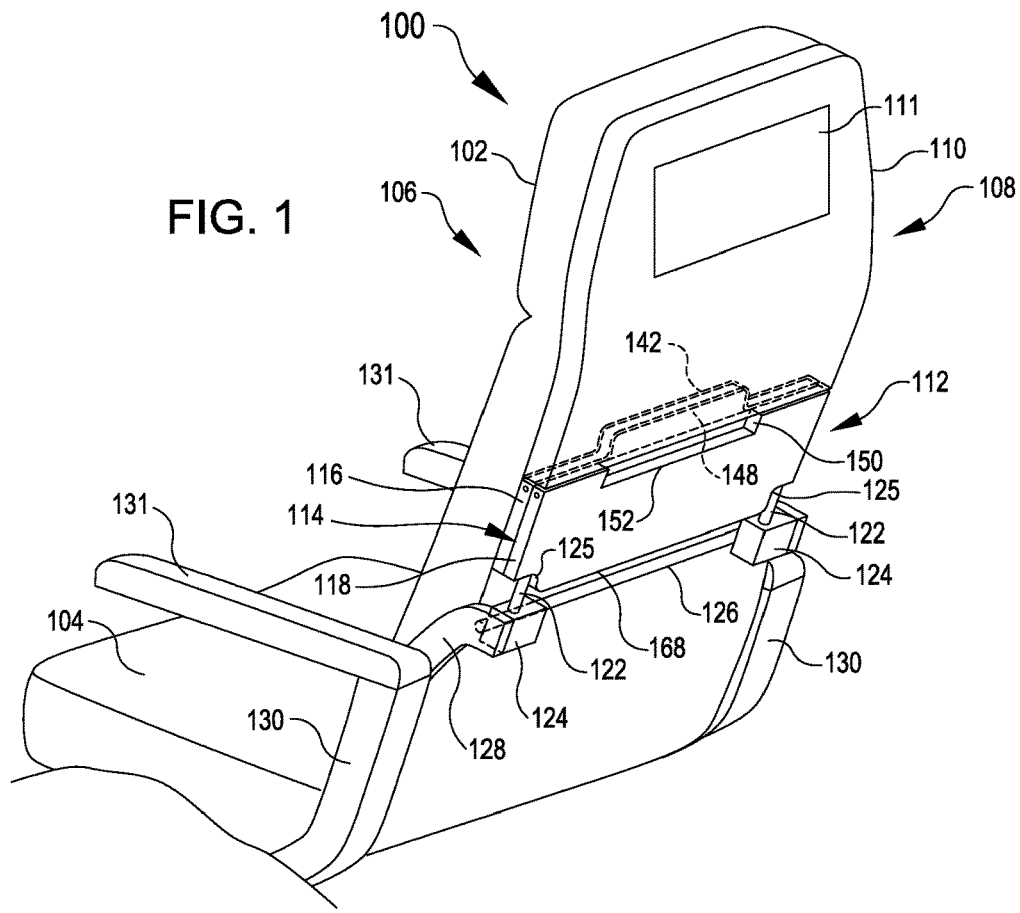
FIG. 1 is a perspective rear view of seat with a tray table in a stowed configuration, according to certain embodiments of the present disclosure.
Figure 2:
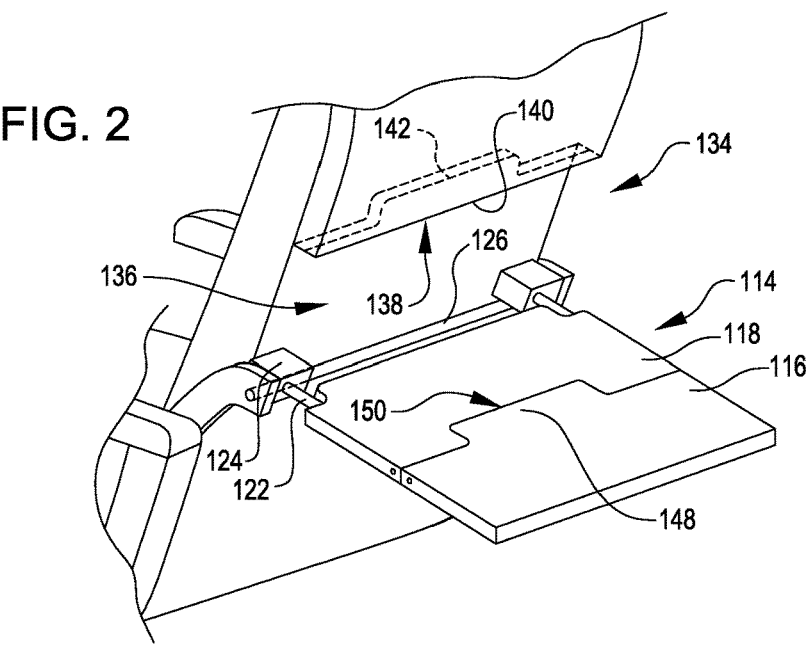
FIG. 2 is a perspective rear view of the seat of FIG. 1 with the tray table in a deployed configuration.

According to certain embodiments of the present disclosure, as shown in FIGS. 1-6, a seat 100 may be provided with a tray table assembly 112. Generally, FIGS. 1 and 2 are perspective views showing the tray table assembly 112 in a stowed configuration (FIG. 1) and a deployed configuration (FIG. 2), and FIGS. 3-6 are cross-sectional views showing elements of the tray table assembly 112 in greater detail during transition between the stowed and deployed configurations. The illustrated seat 100 includes a seat back 102, a seat pan 104, spreaders 130, armrests 131, and a shroud 110. The illustrated tray table assembly 112 includes a table body 114, arms 128, a biasing mechanism 144, a lip 140, and a cavity 142.

With reference to FIG. 1, the seat back 102 and seat pan 104 form the primary surfaces for supporting a passenger in the seat 100. The seat pan 104 may be oriented substantially horizontally, for example, to provide a suitable surface for receiving the thighs and buttocks of a seated passenger. The seat back 102 may be oriented substantially vertically, for example, to provide a suitable surface for receiving a back, neck, and head of a seated passenger. The seat back 102 may recline in various embodiments, for example, to allow different options for supporting passengers in seated, prone, or other positions.

The seat back 102 has a front 106 and a rear 108. In various embodiments, the seat pan 104 and the front 106 of the seat back 102 include non-rigid or pliable materials (e.g., fabric, textiles, foam, or other cushioning material) for the comfort of passengers when supported in the seat 100. Other more rigid materials may also be included, such as to reinforce pliable materials, or to provide components for other functions. For example, the shroud 110 may correspond to a component that is formed from rigid material and that is coupled with cushioning material of the seat back 102. Suitable examples of rigid material that may be used for the shroud 110 and/or other components described herein include, but are not limited to, aluminum, stainless steel, aramid fibers, polycarbonate, polypropylene, other metallic materials, composite materials, or other similar materials.

The spreaders 130 may support the armrests 131 relative to the seat 100. The armrests 131 may provide structure for supporting arms of a passenger when supported by the seat 100. In various embodiments, the spreaders 130 and/or armrests 131 provide a physical lateral boundary for the seat 100, for example, providing a physical distinction between multiple seats 100 positioned laterally adjacent one another, such as in rows in an aircraft. Multiple seats 100 may also be arranged fore or aft of one another, e.g., such that a passenger supported by the front 106 of one seat back 102 may face the rear 108 of another seat back 102. The rear 108 of the seat back 102 may include features accessible to a passenger facing the rear 108 of the seat back 102. For example, the shroud 110 (or seat back 102) may include a screen, telephone, or other form of interface 111 for communication, entertainment, etc. Additionally or alternatively, the rear 108 of the seat back 102 may include a tray table assembly 112, such as to provide a table body 114 that can function as a flat surface for a passenger when desired (e.g., FIGS. 2 and 6).

The illustrated table body 114 may be formed from a first leaf 116 and a second leaf 118. As best seen in FIG. 2, the first leaf 116 and second leaf 118 are illustrated as generally rectangular in shape, although other geometries may be used as well. In the embodiment depicted in the drawings (e.g., FIG. 1), a tab 148 may project out from a rectangular profile of the second leaf 118. A corresponding notch 150 may project into a rectangular profile of the illustrated top leaf 116, for example, at a location at which the second leaf 118 and the first leaf 116 interface or otherwise cooperate with one another. The notch 150 and tab 148 can correspond in size to one another such that the tab 148 can be received in the notch 150 when the tray table assembly 112 is deployed (e.g., FIG. 2). For example, this may allow the first leaf 116 and the second leaf 118 to fit together to form a substantially continuous surface, such as within a substantially rectangular or square profile of the table body 114.

The arms 128 can support the table body 114 relative to the seat 100. For example, in the illustrated embodiment (e.g., FIG. 1), each arm is 128 coupled with the seat 100 between the spreader 130 and the seat back 102. In various embodiments, the arms 128 can pivot and at least partially adjust a position of the table body 114. In the illustrated embodiment, the arms 128 support the table body 114 via a stiffener rod 126, pivot blocks 124, and guide rods 122. The stiffener rod 126 can extend laterally between the arms 128. The pivot blocks 124 can rotate relative to the arms 128, e.g., about the stiffener rod 126. The guide rods 122 can extend from the pivot blocks 124 to the table body 114, such as into the second leaf 118. In various embodiments, a rectangular profile of a part of the table body 114 (e.g., the second leaf 118) can have corners or other edges that are contoured to match the pivot blocks 124. For example, in the embodiment depicted in the drawings (e.g., FIG. 1), the second leaf 118 has jogging, notched, or stair-stepping corners 125 along a bottom surface 168 that can allow the bottom surface 168 to be positioned at least partially between the pivot blocks 124, such as in response to movement along the guide rods 122.

Turning to FIGS. 3-6, the seat back 102 may have a tray table receiving portion 134 (e.g., FIG. 4). The tray table receiving portion 134 may have a receiving surface 136 and a securement surface 138. The securement surface 138 may be formed as a lip 140 that can extend along the rear 108 of the seat 100, for example, in a downward direction such as generally toward the seat pan 104. In various embodiments, the lip 140 may be formed in the shroud 110. The lip 140 can define a cavity 142 (e.g., FIG. 4). The cavity 142 may be positioned between the lip 140 and the front 106 of the seat back 102 (e.g., FIG. 2). The cavity 142 may be sized to receive at least a portion of the table body 114. For example, in the stowed configuration shown in FIG. 3, the tab 148 of the first leaf 116 may be received in the cavity 142.

A biasing mechanism 144 can bias the table body 114 into the cavity 142 in the stowed configuration. For example, the biasing mechanism 144 shown in FIG. 3 is a spring 146 located within a bore 154 in the second leaf 118 for receiving the guide rod 122. In use, the guide rod 122 may slide within the bore 154 to permit movement of the table body 114. Any suitable mechanism (not shown) may be used to prevent the guide rod 122 from exiting the bore 154 at the end of the course of travel, including, but not limited to spring pins, changes in diameter of the guide rod 122, or any other appropriate mechanism. The arrangement depicted in FIG. 3 also includes an aligning pin 156 positioned within the spring 146 and the guide rod 122. The aligning pin 156 may concentrically align the spring 146 and the guide rod 122. However, other options are also possible for the biasing mechanism 144. For example, the biasing mechanism 144 may be located elsewhere than within the depicted bore 154. Options include, but are not limited to, other positions along the guide rods 122, the arms 128, or the pivot blocks 124. Also, other types of biasing mechanisms 144 may additionally or alternatively be used, including, but not limited to, pneumatic assemblies or hydraulic assemblies (e.g., such as those with push-buttons typically used to control reclining of seats in aircraft).

An example sequence of operations for transitioning the tray table assembly 112 from the stowed configuration to the deployed configuration will now be described, primarily with reference to FIGS. 3-6. As shown in FIG. 3, in the stowed configuration, a top surface 176 of the first leaf 116 (e.g., of the tab 148) may contact or be in close proximity to a bottom surface 162 of the cavity 142. Similarly, in the stowed configuration, a top surface 178 of the second leaf 118 may contact or be in close proximity to a bottom surface 160 of the lip 140. The biasing mechanism 144 may provide an upwardly oriented biasing force that urges the tray table assembly 112 into such engagement. Such engagement may effectively reduce or eliminate a gap 158 (e.g., FIG. 4) between the top surface 178 of the second leaf 118 and the bottom surface 160 of the lip 140, for example, providing a tight and aesthetically pleasing seam when viewed from the rear 108 of the seat back 102, such as in FIG. 1. However, the notch 150 in the second leaf 118 may provide a gripping surface 152 (e.g., FIGS. 1 and 3) that is located sufficiently below the lip 140 in the stowed configuration to permit a passenger to insert fingers into the notch 150 and reach the gripping surface 152. The passenger may thus grip the second leaf 118 at the gripping surface 152 and pull downward (e.g., in the direction of the arrow 182). Such downward pulling may move both parts of the table body 114 downward, for example, moving both a bottom surface 166 of the first leaf 116 and a bottom surface 168 of the second leaf 118 toward the pivot blocks 124. Such downward pulling may also exert a sufficient force on the tray table assembly 112 to compress the spring 146 (or otherwise overcome the biasing force provided by the biasing mechanism 144) and move the tray table assembly 112 out of the cavity 142, such as into a disengaged position shown in FIG. 4.

In the disengaged position shown FIG. 4, the top surface 178 of the first leaf 116 is positioned below the bottom surface 160 of the lip 140. Such positioning may allow the first leaf 116 to be rotated past the lip 140, e.g., in the direction depicted by the arrow 184. Such movement may be achieved by pulling outwardly away from the seat back 102, for example, by the passenger gripping the gripping surface 152. This outward pulling represented by arrow 184 may be performed as a distinct motion from the downward pulling represented by arrow 182 in FIG. 3, or both may be performed in a combined downward and outward motion.

Figure 5:
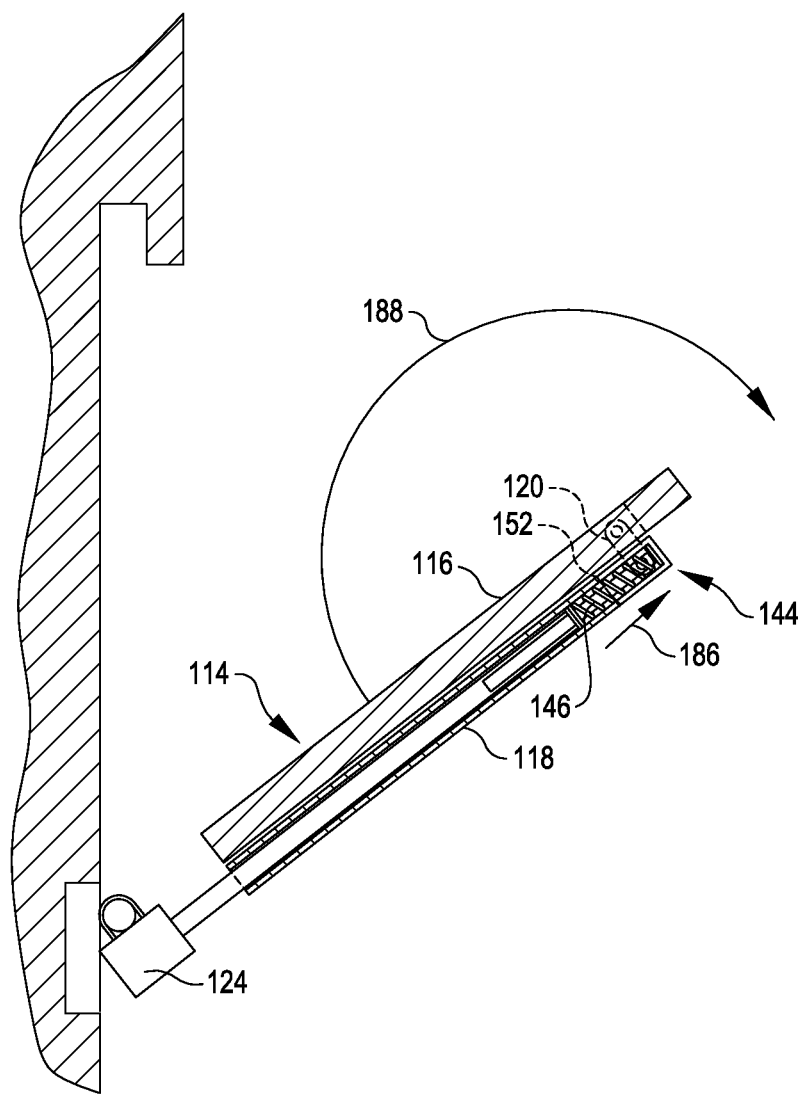
FIG. 5 is a side cross-sectional view of the tray table assembly of the seat of FIGS. 1-4, showing the tray table being deployed.

As best seen in FIG. 5, upon rotating the table body 114 past the lip 140, the passenger may cease pushing against the gripping surface 152. As depicted by the arrow 186, this may allow the biasing mechanism 144 to bias the table body 114 away from the pivot blocks 124, e.g., allowing the spring 146 to decompress to a neutral state. As depicted by the arrow 188, the first leaf 116 may also be rotated relative to the second leaf 118 (e.g., via hinges 120) to transition the table body 114 toward the deployed state shown in FIG. 6. For example, prior to such rotation, the pieces of the table body 114 may be stacked such that the first leaf 116 corresponds to a top leaf and the second leaf 118 corresponds to a bottom leaf in the stack. The motions represented in FIG. 5 by the arrows 186 and 188 may be performed in any order, including simultaneously.

Figure 6:
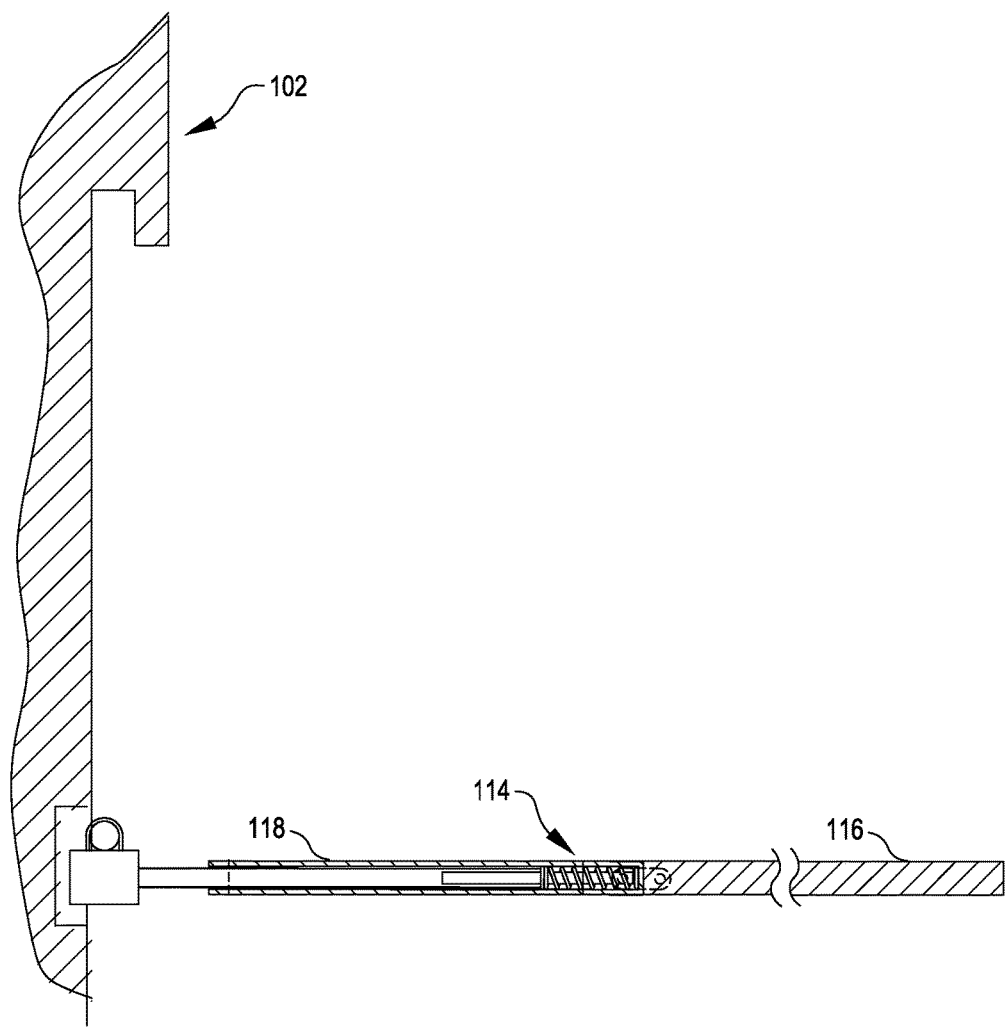
FIG. 6 is a side cross-sectional view of the tray table assembly of the seat of FIGS. 1-5, showing the tray table in the deployed configuration.

In the deployed state shown in FIG. 6, the table body 114 extends transverse to the seat back 102. To return the tray table assembly 112 to the stowed state, motions described in FIGS. 3-5 can be reversed. For example, the first leaf 116 can be folded to stack on top of the second leaf 118 (opposite of the arrow 188 of FIG. 5), the force of the biasing mechanism 144 can be overcome (e.g., the spring 146 can be compressed by pushing the table body 114 toward the pivot blocks 124, such as in a direction opposite of that shown by arrow 186 of FIG. 5), the table body 114 can be rotated toward the seat back 102 into an aligned position below the lip 140 (e.g., pushing inwardly in a direction opposite that shown by arrow 184 to reach a position such as shown in FIG. 4), and the table body 114 can be released to allow the biasing mechanism 144 to move the table body 114 into engagement with the cavity 142 behind the lip 140 (e.g., moving in a direction opposite of the arrow 182 shown in FIG. 3).

Figure 7:
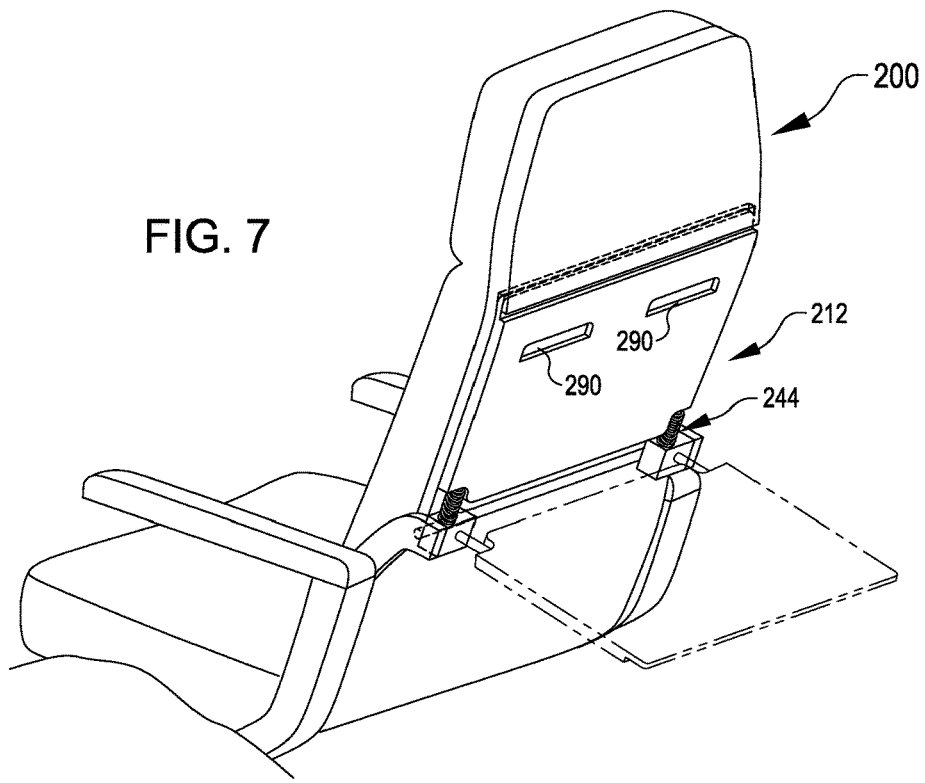
FIG. 7 is a perspective rear view of a seat with a tray table movable between stowed and deployed configurations, according to certain embodiments of the present disclosure.
Figure 8:
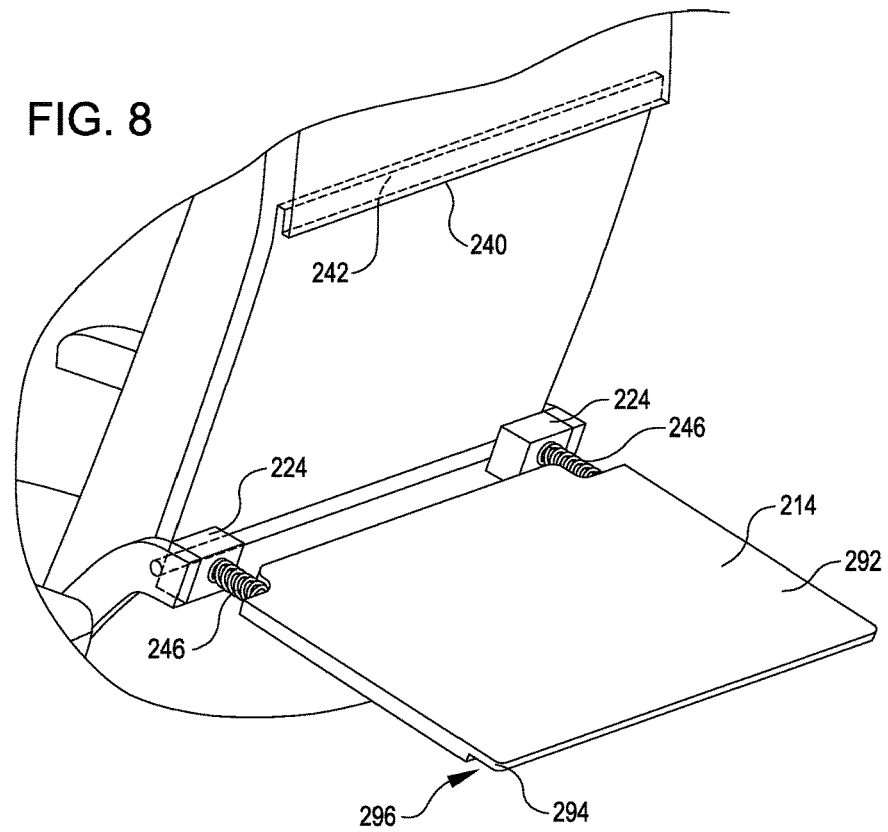
FIG. 8 is a perspective rear view of the seat of FIG. 7, showing the tray table in a deployed configuration in greater detail.

According to further embodiments of the present disclosure, as shown in FIGS. 7-8, a seat 200 may be provided with a tray table assembly 212. The seat 200 and tray table assembly 212 may include features that are similar to features of like name and number described above with respect to the seat 100 and tray table assembly 212 shown in FIGS. 1-6. Accordingly, description of many features will not be repeated. A stowed configuration is shown in solid lines in FIG. 7, and a deployed configuration is shown in phantom lines in FIG. 7 and in greater detail in solid lines in FIG. 8.

The depicted tray table assembly 212 features a table body 214 formed from a single panel 292. A ridge 294 is formed along a length of a top edge of the single panel 292. For example, a depression 296 may be formed along the top edge of the single panel 292 so that the ridge 294 corresponds to a portion of the single panel 292 that is not as thick as the remainder of the single panel 292. A lip 240 defines a cavity 242 extending across a width of the seat 200.

The ridge 294 of the single panel 292 is biased into the cavity 242 by biasing mechanisms 244 when the tray table assembly 212 is in a stowed configuration. The biasing mechanisms 244 are depicted as springs 246 located externally to the single panel 292 and between the single panel 292 and pivot blocks 224. However, the biasing mechanisms 244 may vary in location or type in any of the ways described above for the biasing mechanisms 144.

A bottom side of the single panel 292 includes grooves 290. The grooves 290 may be sized to receive fingers of passengers or otherwise provide appropriate gripping surfaces for manipulating the tray table assembly 212 between stowed and deployed configurations. Although two oval-shaped grooves 290 are shown, any number of grooves 290 may be provided (including one, two, three, or more than three) of any suitable shape. Additionally or alternatively, the grooves 290 may be replaced with or supplemented by gripping features of any suitable shape, including, but not limited to tabs or other projections. The single panel 292 may be moved between stowed and deployed configurations in a similar manner to the motions described above, e.g., with respect to arrows 182, 184, and 186.

In various embodiments, features from the seat 200 or tray table assembly 212 may be incorporated into the seat 100 or tray table assembly 112 or vice versa. As one example, the grooves 290 or like features may be included on the second leaf 118 of FIGS. 1-6 to facilitate passenger manipulation between stowed and deployed configurations. Including the grooves 290 or other features may allow the notch 150 and/or tab 148 to be omitted or shaped differently, for example, so that the table body 114 when stowed is flush with the shroud 110 along a full width of the table body 114. In some embodiments, ridges 294 and depressions 296 may be included in either or both of the second leaf 118 and the first leaf 116, for example to facilitate engagement between the second leaf 118 and the first leaf 116 when deployed and to respectively engage contours of the lip 140 and the cavity 142 when stowed.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table assembly configured to be coupled with or incorporated into a passenger seat back and comprising:
    a table body movable between a stowed configuration and a deployed configuration, the table body in the stowed configuration positioned so that at least a portion of the table body is situated within a cavity defined along and behind a downwardly projecting lip that extends flush with a rear face of an upper part of the passenger seatback; and
    a biasing mechanism configured in a biasing state to exert a biasing force to bias the table body into the cavity when the table body is in or approaching the stowed configuration and configured in an overcome state, in which the biasing force is overcome, to permit the table body to be rotated past the downwardly projecting lip.

2. The tray table assembly of claim 1, wherein the biasing mechanism comprises a spring, and wherein the table body in the deployed configuration extends transverse to the orientation of the table in the stowed configuration.

3. The tray table assembly of claim 1, wherein the table body comprises a first leaf hinged with a second leaf.

4. The tray table assembly of claim 1, wherein the table body comprises a single panel.

5. A passenger seat comprising:
a seat back having a front a rear, and an upper part;
a lip projecting downwardly along the rear of the seat back and extending in line with a rear face of the upper part of the seat back;
a cavity defined at least partially by the lip and behind the lip;
a table body movable between a stowed configuration and a deployed configuration, the table body in the stowed configuration positioned so that at least a portion of the table body is situated within the cavity; and
a biasing mechanism in a biasing state exerting a biasing force biasing the table body into the cavity when the table body is in the stowed configuration, the biasing mechanism permitting the table body to be rotated past the downwardly projecting lip in an overcome state in which the biasing force is overcome.

6. The passenger seat of claim 5, wherein the table body comprises a first leaf and a second leaf.

7. The passenger seat of claim 6, wherein first leaf comprises a tab and the second leaf comprises a notch, the notch sized to receive the tab in the deployed configuration, and the notch sized to receive one or more fingers of a person in the stowed position so as to facilitate pulling the table body from the stowed configuration.

8. The passenger seat of claim 5, wherein the table body comprises a single leaf.

9. The passenger seat of claim 8, wherein the single leaf comprises a groove in a side of the single leaf facing away from the front of the seat back, the groove sized to receive one or more fingers of a person in the stowed position so as to facilitate pulling the table body from the stowed position.

10. The passenger seat of claim 5, wherein the biasing mechanism comprises a spring.

11. The passenger seat of claim 5, wherein the biasing mechanism is located at least partially within the table body.

12. The passenger seat of claim 5, the table body is pivotally coupled with the seat back so as to at least partially rotate in moving between the deployed and stowed configurations, the table body in the deployed configuration extending transverse to the seat back.

13. The passenger seat of claim 5, further comprising a shroud coupled with the seat back, the shroud comprising the lip.

14. A method comprising:
receiving, along a seat back, a table body rotated into an aligned position beneath a cavity defined by and behind a downwardly projecting lip that extends even with a rear face of an upper part of the seat back; and
biasing, from the aligned position beneath the cavity, at least a portion of the table body upward into the cavity by a biasing force provided by a biasing mechanism configured to be overcome to permit rotation of the table body past the downwardly projecting lip.

15. The method of claim 14, wherein the biasing mechanism comprises a spring.

16. The method of claim 14, further comprising:
receiving, along the seat back, the table body translated from at least partially within the cavity into a disengaged position beneath the cavity in response to a downward force exerted on the table body with sufficient magnitude to overcome a biasing force provided by the biasing mechanism; and
providing, in a position transverse to the seat back, the table body rotated from the disengaged position.

17. The method of claim 14, further comprising:
providing a flat surface of the table body by a first leaf of the table body rotating about hinges coupling the first leaf of the table body with a second leaf of the table body.

18. The method of claim 14, further comprising:
receiving the table body translated toward the seat back into a ready configuration in response to a pushing force exerted on the table body with sufficient magnitude to overcome a biasing force provided by the biasing mechanism;
wherein receiving the table body rotated into the aligned position comprises receiving the table body rotated from the ready configuration.

19. The method of claim 14, wherein the table body comprises a first leaf and a second leaf.

20. The method of claim 14, wherein the table body comprises a single leaf.

* * * * *